(12) United States Patent
Santana et al.

(10) Patent No.: US 10,577,030 B1
(45) Date of Patent: Mar. 3, 2020

(54) POWERED TAILGATE REMOVAL ASSEMBLY AND METHOD

(71) Applicant: Ford Global Technologies, LLC, Dearborn, MI (US)

(72) Inventors: Manuel Santana, Livonia, MI (US); Joshua Robert Hemphill, White Lake, MI (US); Brian Kenneth Sullivan, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 16/056,974

(22) Filed: Aug. 7, 2018

(51) Int. Cl.
  *B62D 33/027*    (2006.01)
  *B62D 33/03*    (2006.01)
  *B62D 33/033*    (2006.01)

(52) U.S. Cl.
  CPC ......... *B62D 33/0273* (2013.01); *B62D 33/03* (2013.01); *B62D 33/033* (2013.01)

(58) Field of Classification Search
  CPC ... B62D 33/0273; B62D 33/03; B62D 33/033
  See application file for complete search history.

(56) References Cited

U.S. PATENT DOCUMENTS

| | | | |
|---|---|---|---|
| 6,637,796 B1 | 10/2003 | Westerdale et al. | |
| 8,696,046 B2 | 4/2014 | Sackett | |
| 8,903,605 B2 * | 12/2014 | Bambenek | G07C 5/008 16/308 |
| 9,797,180 B2 | 10/2017 | Salmon et al. | |
| 9,923,294 B1 | 3/2018 | Maranville | |
| 2008/0217949 A1 * | 9/2008 | Kobrehel | B60P 1/435 296/61 |
| 2008/0252094 A1 | 10/2008 | Schulte et al. | |
| 2011/0057469 A1 * | 3/2011 | Zielinsky | B60P 1/267 296/57.1 |
| 2016/0160553 A1 * | 6/2016 | Nania | E05F 15/627 296/50 |
| 2018/0313117 A1 * | 11/2018 | Whitham | E05B 77/00 |

* cited by examiner

*Primary Examiner* — Lori L Lyjak
(74) *Attorney, Agent, or Firm* — David Coppiellie; Carlson, Gaskey & Olds, P.C.

(57) ABSTRACT

An exemplary removal assembly includes, among other things, a lock that rotates together with a powered tailgate when the powered tailgate is coupled to a vehicle in a coupled position and moved back-and-forth between an open and a closed position. The lock is rotatable between a locked position that blocks movement of the powered tailgate from the coupled position, and an unlocked position that permits removal of the powered tailgate. An exemplary removal method includes, among other things, moving a powered tailgate that is coupled to a vehicle in a coupled position. The moving transitions a lock from a locked position to an unlocked position. The lock in the locked position blocks movement of the powered tailgate from the coupled position. The lock in the unlocked position permitting removal of the powered tailgate.

18 Claims, 4 Drawing Sheets

POWERED TAILGATE REMOVAL ASSEMBLY AND METHOD

TECHNICAL FIELD

This disclosure relates generally to removing a tailgate from a vehicle and, more particularly, to powered tailgate removal.

BACKGROUND

Pickup trucks typically include a latching tailgate that swings between an upright, closed position and a horizontal, open position. When in the closed position, the tailgate is latched to a cargo box. When open, on the other hand, the tailgate provides access to the cargo box.

Commonly, tailgates are manually opened and closed by a user. For example, a handle on the tailgate can be pulled to unlatch the tailgate from the cargo box, permitting movement of the tailgate to the open position. Some pickup trucks may include powered tailgate assemblies (or simply, "powered tailgates"), which include tailgates moved between the open and closed positions by one or more automated mechanisms. Powered tailgate assemblies are often provided as an aftermarket accessory.

SUMMARY

A removal assembly according to an exemplary aspect of the present disclosure includes, among other things, a lock that rotates together with a powered tailgate when the powered tailgate is coupled to a vehicle in a coupled position and moved back-and-forth between an open and a closed position. The lock is rotatable between a locked position that blocks movement of the powered tailgate from the coupled position, and an unlocked position that permits removal of the powered tailgate.

In another example of the foregoing assembly, the lock comprises a cup that rotates together with the powered tailgate about an axis.

In another example of any of the foregoing assemblies, a flange of the powered tailgate or the cup is received within a slot in the other of the powered tailgate or the cup. The flange within the slot rotatably couples the cup to the powered tailgate.

Another example of any of the foregoing assemblies includes a mounting bracket secured to a vehicle body structure. The cup is pivotably mounted to the mounting bracket.

In another example of any of the foregoing assemblies, the flange extends from the powered tailgate and the slot is within the cup.

Another example of any of the foregoing assemblies includes a drive unit that moves the powered tailgate back-and-forth between the open and closed positions.

In another example of any of the foregoing assemblies, a drive rod of the drive unit extends from the powered tailgate.

Another example of any of the foregoing assemblies includes a drive rod of a drive unit coupled to a drive rod support when the powered tailgate is coupled to the vehicle. The drive unit is configured to move the powered tailgate back-and-forth between the open and closed positions.

In another example of any of the foregoing assemblies, the lock comprises a cup that rotates together with the powered tailgate about an axis relative to the drive rod support. The cup in the locked position blocks a withdrawal of the drive rod from the drive rod support. The cup in the unlocked position permits the withdrawal.

In another example of any of the foregoing assemblies, the cup in the locked position blocks the decoupling by blocking radial movement of the drive rod relative to the drive rod support. The cup in the unlocked position has a slot that is circumferentially positioned such that the slot provides clearance to move the drive rod radially relative to the drive rod support.

In another example of any of the foregoing assemblies, the drive rod support slideably receives the drive rod when the powered tailgate is coupled to the vehicle.

In another example of any of the foregoing assemblies, the lock is in the unlocked position when the powered tailgate is halfway between a fully open position and a fully closed position.

A removal method according to another exemplary aspect of the present disclosure includes, among other things, moving a powered tailgate that is coupled to a vehicle in a coupled position. The moving transitions a lock from a locked position to an unlocked position. The lock in the locked position blocks movement of the powered tailgate from the coupled position. The lock in the unlocked position permitting removal of the powered tailgate.

In another example of any of the foregoing assemblies, the lock is a cup having a slot, and the lock is transitioned to the locked position when the cup is rotated such that the slot is in a position where the slot permits movement of the powered tailgate from the coupled position.

Another example of any of the foregoing assemblies includes rotating the cup together with the powered tailgate using a flange that is at least partially received within the slot.

In another example of any of the foregoing assemblies, the cup is pivotably connected to a vehicle body structure and the flange extends from the tailgate.

In another example of any of the foregoing assemblies, the cup at least partially receives a drive rod of a drive unit that is configured to move the powered tailgate back and forth between the open and closed position.

In another example of any of the foregoing assemblies, the moving is between an open position and a closed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a motor vehicle, such as a pickup truck, that includes a removal assembly permitting a user to remove a powered tailgate from the motor vehicle. When a lock of the removal assembly is locked, the powered tailgate is blocked from being removed from the vehicle. The lock, when unlocked, permits removal of the powered tailgate from the vehicle.

Figure 1:
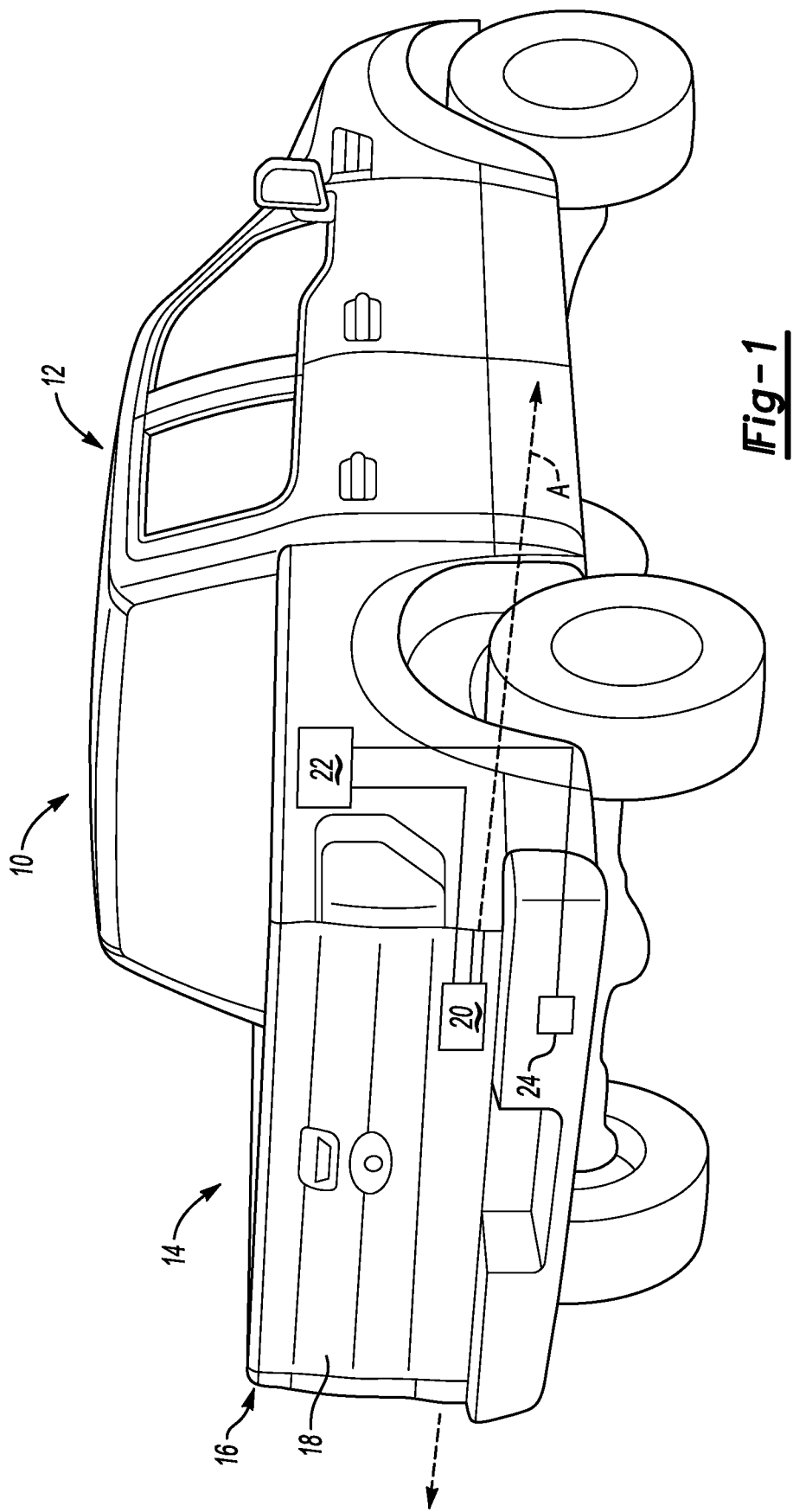
FIG. 1 illustrates a rear-perspective view of a motor vehicle, which, in this example, is a pickup truck with a tailgate in a fully closed position.

FIG. 1 illustrates a motor vehicle 10 ("vehicle 10"), which in this example is a pickup truck. The vehicle 10 includes a passenger cabin 12 and a cargo box 14. The vehicle further includes a powered tailgate assembly 16, which includes a tailgate 18 rotatable about the hinge adjacent the vertical bottom of the tailgate 18.

While references made herein to a "powered tailgate assembly" and a "tailgate," certain aspects of this disclosure may apply to a powered liftgate assembly. Further, this disclosure is not limited to pickup trucks and extends to other types of vehicles that may include a powered tailgate or liftgate assembly.

Figure 2:
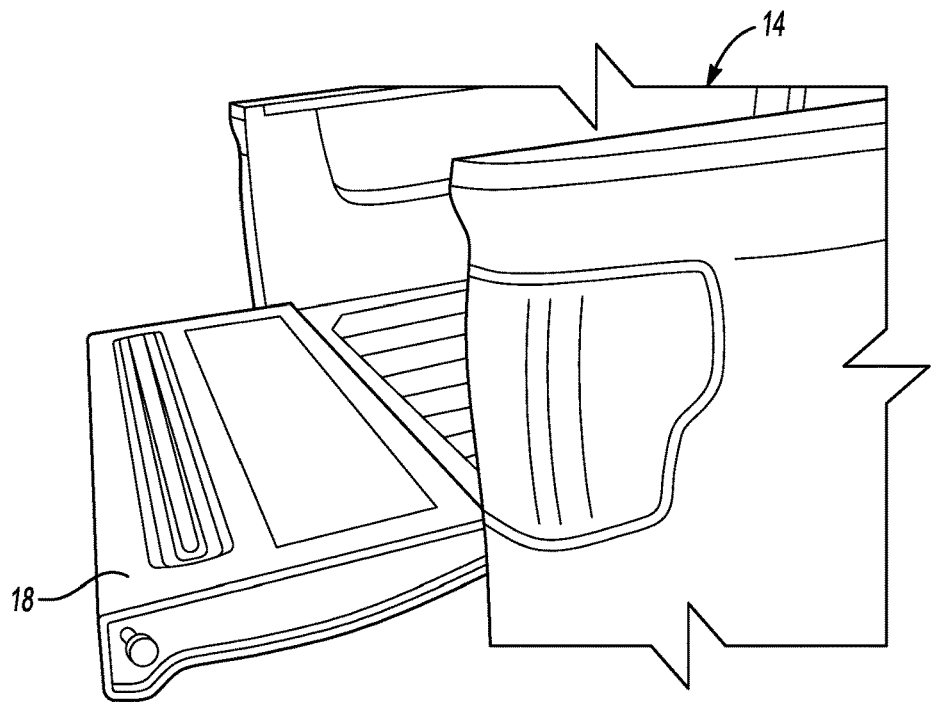
FIG. 2 illustrates a rear-perspective view of the pickup truck of FIG. 1 with the tailgate in a fully open position.

The tailgate 18 is configured to move between a fully closed position (FIG. 1) and a fully opened position (FIG. 2). The powered tailgate assembly 16 further includes an actuator 20 mechanically coupled to the tailgate 18. The actuator 20 is configured to rotate the tailgate 18 throughout a range of positions between the fully closed and fully opened positions.

The actuator 20 is electrically coupled to a controller 22, and is responsive to instructions, or commands, from the controller 22. The powered tailgate assembly 16 may also include one or more sensors 24 that provide information to the controller 22. The sensors 24 may be configured to generate signals indicative of a position of the tailgate 18. The sensors 24 could be provided by sensors that already exist on the vehicle 10, such as cameras. Alternatively, the powered tailgate assembly 16 could include its own dedicated sensors. While the sensor is shown schematically in FIG. 1, it should be understood that this disclosure is not connected to any particular sensor type.

The controller 22 is also shown schematically in FIG. 1. However, it should be understood that the controller 22 can be part of an overall vehicle module, such as vehicle system controller (VSC), or could alternately be a standalone controller separate from the VSC. Further, the controller may be programmed with executable instructions for interfacing with and operating the various components of the vehicle 10. The controller 22 additionally includes a combination of hardware and software and further includes a processing unit and non-transitory memory for executing the various control strategies and modes of the vehicle system.

While FIGS. 1 and 2 illustrate the tailgate 18 in fully closed and fully open positions, respectively, the tailgate 18 is moveable to a plurality of positions between the fully closed and fully opened positions. Specifically, the actuator 20, in response to instructions from the controller 22, is configured to rotate the tailgate 18 to a plurality of intermediate positions between a fully closed and fully opened positions. The controller 22 is also configured to monitor conditions and positions of the tailgate 18 in order to manage movement of the tailgate 18 such that it prevents theft and protects goods within the cargo box 14 while avoiding any interference with the user that may be actively loading or unloading goods.

The tailgate 18 is pivotably coupled to the vehicle 10. The tailgate 18 can pivot between the open and closed positions about an axis A. From time to time, the user may desire to decouple (i.e., remove) the tailgate 18 from the vehicle 10. Removing the tailgate 18 may be desirable to, for example, install a camper on the vehicle 10, to accommodate particular types of cargo within the cargo box 14, for service, or for some other reason.

In the past, tailgates have been removable, but the removing requires a user to, for example, manually withdraw a locking pin. The tailgate 18 is removable from the vehicle 10 without requiring such user interaction.

Figure 3:
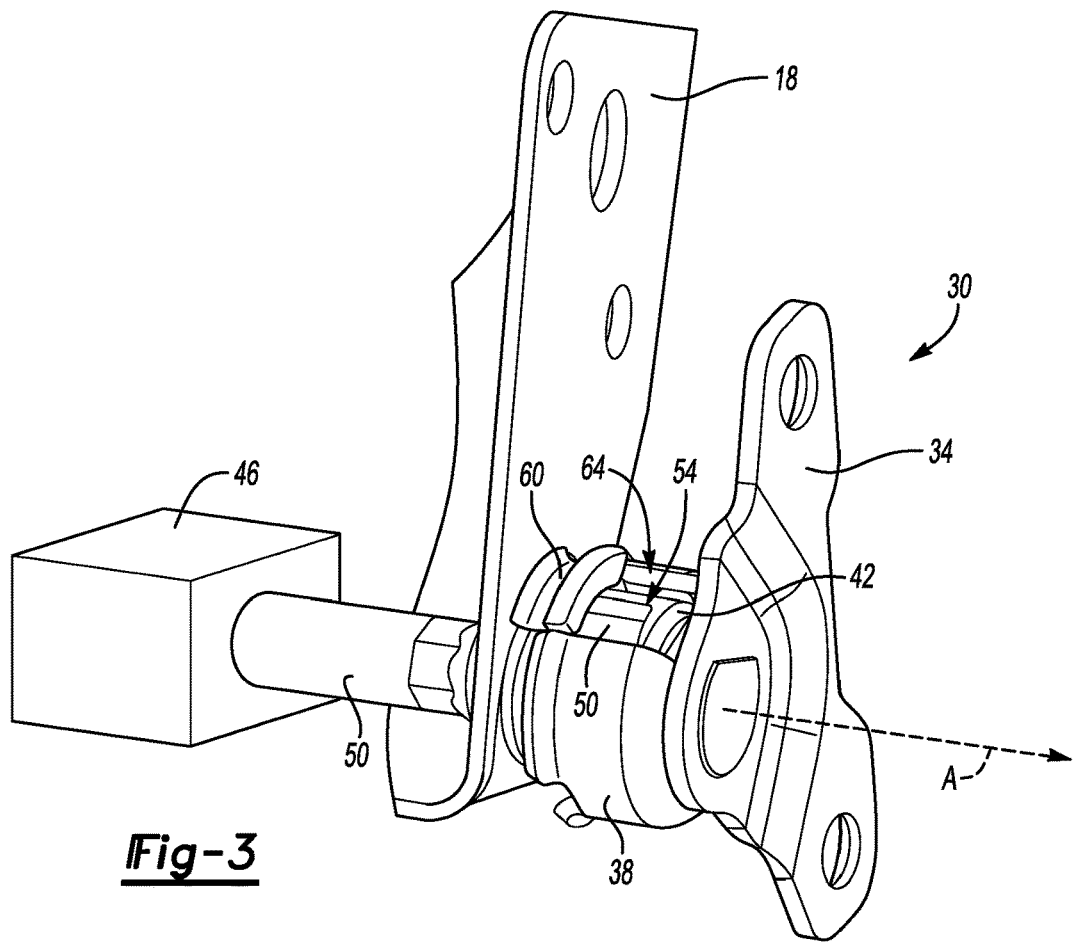
FIG. 3 illustrates a perspective view of a portion of the tailgate in the position of FIG. 1 along with a lock.
Figure 4:
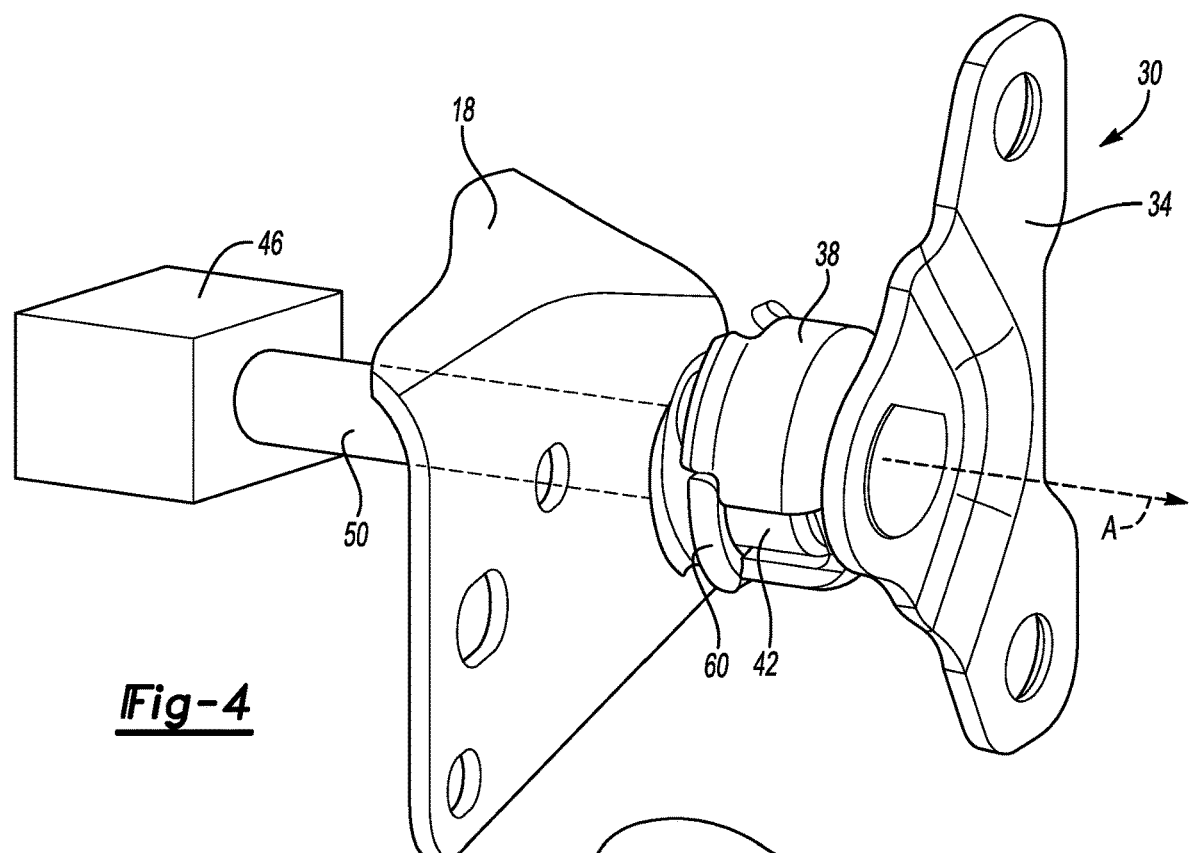
FIG. 4 illustrates a perspective view of the portion of the tailgate in the position of FIG. 2 along with the lock.
Figure 5:
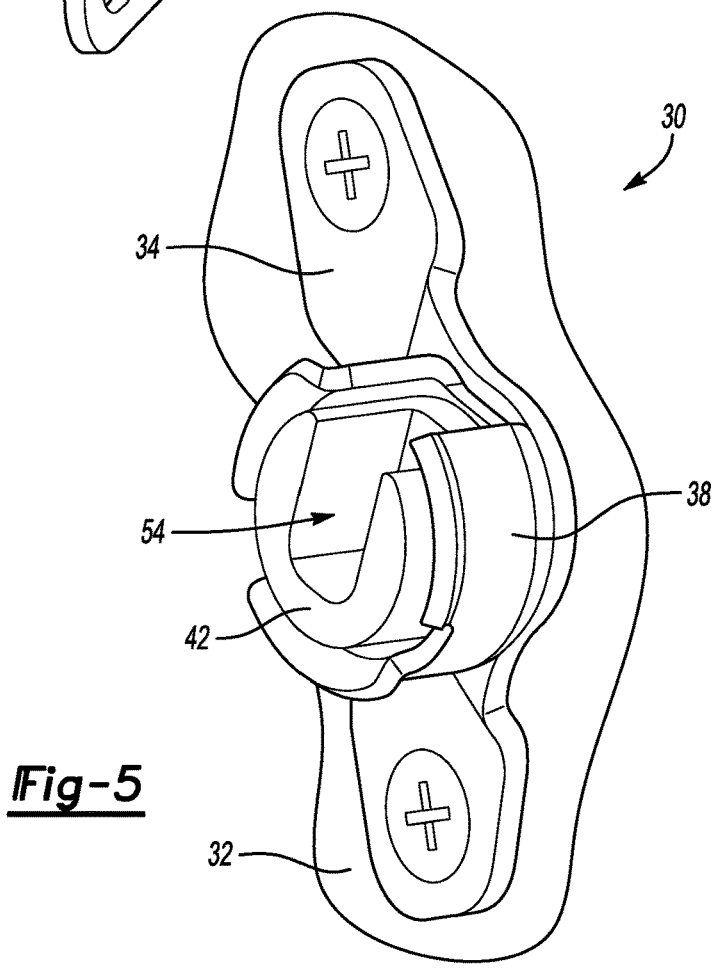
FIG. 5 illustrates a perspective view of the lock in an unlocked position.

With reference now to FIGS. 3-5, a removal assembly is used to selectively permit removal of the tailgate 18. The removal assembly comprises a hinge assembly 30 that pivotably couples the tailgate 18 to a vehicle body structure 32 of the vehicle 10. The hinge assembly 30 includes a mounting bracket 34, a cup 38, and a drive rod support 42.

The hinge assembly 30 is utilized in connection with the actuator 20 to move the tailgate 18 back and forth between the fully closed position of FIGS. 1 and 3, and fully opened position of FIGS. 2 and 4. The hinge assembly 30 is on the passenger side of the tailgate 18 in this example.

Another hinge assembly (not shown) may be located at an opposite, driver side of the tailgate 18. The other hinge assembly pivotably couples the tailgate 18 to a vehicle body structure on an opposite side of the vehicle 10. The other hinge assembly may, or may not, accommodate a drive rod from a drive unit.

The actuator 20 includes a drive unit 46 and a drive rod 50. The drive unit 46 resides within an interior of the tailgate 18. A portion of the drive rod 50 extends laterally from the drive unit 46 and fits within a slot 54 of the drive rod support 42 when the tailgate 18 is pivotably coupled to the vehicle 10.

The mounting bracket 34 is fixed to the vehicle body structure 32 with, for example, mechanical fasteners. The drive rod support 42 is secured to the mounting bracket 34. The drive rod support 42 is not rotatable relative to the mounting bracket 34. The cup 38 is rotatable about the axis A relative to the mounting bracket 34 and the drive rod support 42.

To move the tailgate 18, the drive unit 46 is activated by the controller 22 to cause the drive unit 46 to rotate relative to the drive rod 50. The drive unit 46 is secured to the tailgate 18. Thus, the rotation of the drive unit 46 rotates the tailgate 18. Depending on the direction of rotation about the axis A, the tailgate 18 pivots toward, or away from, the fully closed position. The drive rod support 42 limits rotation of the drive rod 50 due to the lateral outward end of the drive rod 50 being fit within the slot 54.

When the tailgate 18 is in the coupled position, a flange 60 fits within a slot 64 of the cup 38. The cup 38 provide a lock that blocks movement of the tailgate 18 away from the pivotably coupled position, unless the cup 38 is rotated by the flange 60 to particular circumferential positions relative to the axis A.

The flange 60 extends laterally from the tailgate 18 and rotates together with a tailgate 18. As the tailgate 18 is rotated between the open and closed positions about the axis A, the flange 60 presses against the cup 38 to rotate the cup 38 relative to the mounting bracket 34 and the drive rod support 42. The cup 38 thus rotates with the tailgate 18 relative to the mounting bracket 34 and the drive rod support 42 as the tailgate 18 is moved back and forth between the open and closed positions.

In this example, the flange 60 extends from the tailgate 18, and the cup 38 is disposed pivotably coupled to the mounting bracket 34. In another example, this positioning could be reversed such that the cup 38 is pivotably coupled to the tailgate 18 and flange 60 extends from the mounting bracket 34.

Figure 6:
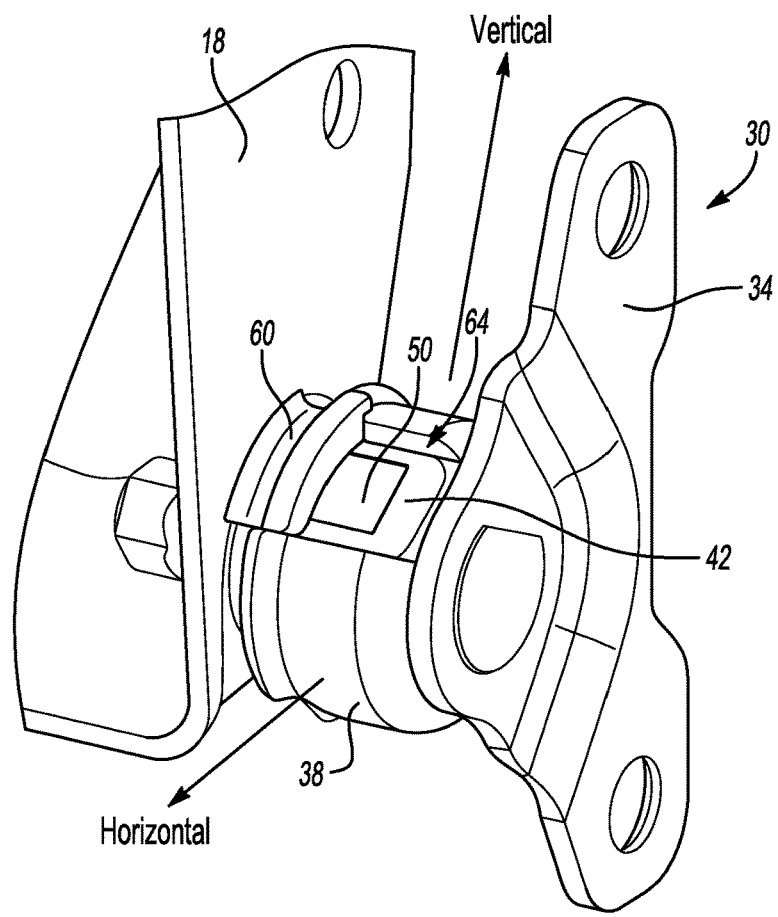
FIG. 6 illustrates a perspective view of the lock and the portion of the tailgate when the lock is in the unlocked position.

To remove the tailgate 18, the tailgate 18 is rotated about the axis to a position where the slot 64 of the cup 38 is circumferentially aligned with the slot 54 of the drive rod support 42 as shown in FIG. 6. In this position, the drive rod 50 can be lifted from the slot 54 of the drive rod support 42 and moved through the slot 64 in the cup 38 until reaching the position of FIG. 7. At this point, the tailgate 18 is no longer pivotably coupled to the vehicle 10 through the hinge assembly 30. The tailgate 18 can then be carried away from the vehicle 10.

An example removal method thus includes moving the tailgate 18, which is coupled to the vehicle 10, to transition a lock from a locked position to an unlocked position. The lock in the locked position blocks removal of the tailgate 18. The lock in the unlocked position permits removal of the powered tailgate 18.

Figure 7:
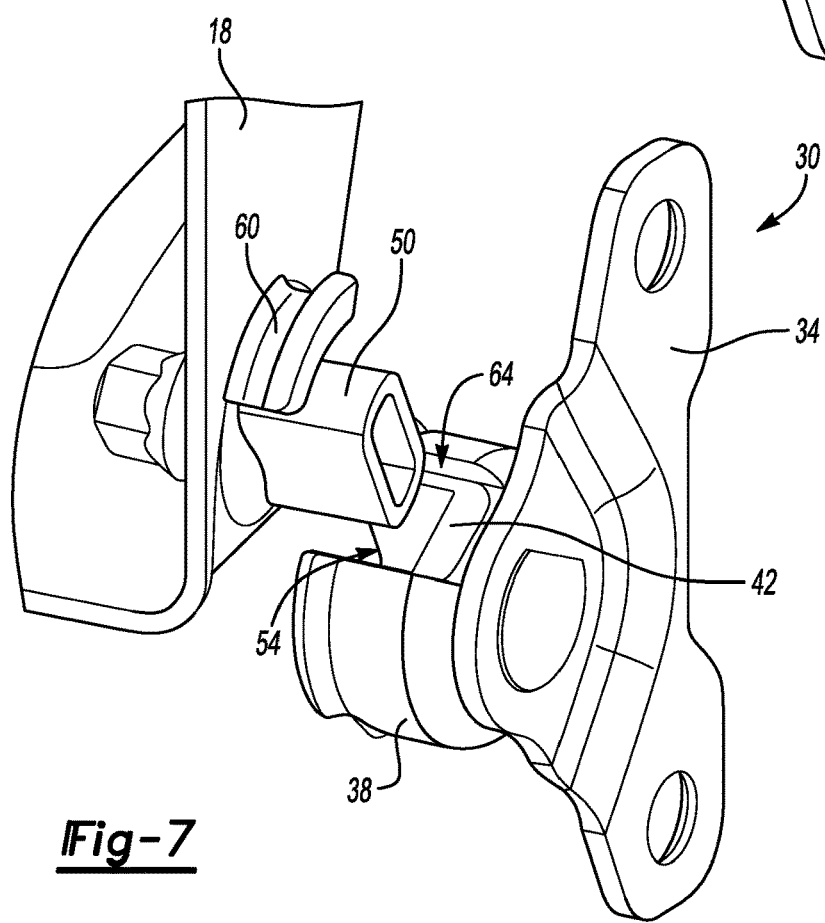
FIG. 7 illustrates a perspective view of the lock and the portion of the tailgate when the tailgate is in a decoupled position from the vehicle.

To move the tailgate 18 back to the coupled position where the tailgate 18 is pivotably coupled to the vehicle 10, the cup 38 can be positioned as shown in FIG. 7. The drive rod 50 can then be passed back through the slot 64 in the cup 38 and slideably received within the slot 54 of the pivot rod support 42. The tailgate 18 can then be pivoted back and forth between the open and closed position by activating the drive unit 46.

When the slot 64 of the cup 38 is not circumferentially aligned with the slot 54, the tailgate 18 is blocked from moving from the coupled position. Attempting to withdraw the drive rod 50 from the slot 54 in the drive rod support 42 when the tailgate is, for example, fully open as shown in FIG. 4, results in the drive rod 50 contacting an interior of the cup 38. This contact blocks movement of the tailgate 18 from the coupled position. When the tailgate 18 is in the fully closed position as shown in FIG. 3, attempts at withdrawing the drive rod 50 from the slot 54 also causes the drive rod 50 to contact the cup 38.

In this example, the block provided by the cup 38 is considered unlocked when the slot 64 is circumferentially aligned with the slot 54 such that the drive rod 50 can be slid out of the slot 54 and the drive rod support 42. When the slot 64 is circumferentially misaligned with the slot 54 and, therefore, blocking withdrawal of the drive rod 50 from slot 54, the cup 38 is in a locked position that blocks movement of the tailgate 18 from the coupled position.

In this example, the lock provided by the cup 38 is in the unlocked position (FIGS. 6 and 7) when the tailgate 18 is halfway between the fully opened position of FIG. 4 and the fully closed position of FIG. 3. The unlocked position corresponds to the tailgate 18 being at approximately a 45° angle relative to horizontal or vertical alignment of the tailgate 18. In other examples, the unlocked position could correspond to other positions of the tailgate 18.

Features of the disclosed examples include the lock that transitions between locked positions that block removal of the tailgate and unlocked positions that permit removal movement of tailgate. The lock can be transitioned between the locked and unlocked positions without requiring significant user interaction. Instead, the user simply positions the powered tailgate such that the components of the lock are appropriately circumferentially aligned.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A removal assembly, comprising:
a lock that rotates together with a powered tailgate when the powered tailgate is coupled to a vehicle in a coupled position and moved back-and-forth between an open and a closed position, the lock rotatable between an locked position that blocks movement of the powered tailgate from the coupled position, and an unlocked position that permits removal of the powered tailgate.

2. The removal assembly of claim 1, wherein the lock comprises a cup that rotates together with the powered tailgate about an axis.

3. The removal assembly of claim 2, wherein a flange of the powered tailgate or the cup is received within a slot in the other of the powered tailgate or the cup, the flange within the slot rotatably coupling the cup to the powered tailgate.

4. The removal assembly of claim 3, further comprising a mounting bracket secured to a vehicle body structure, the cup pivotably mounted to the mounting bracket.

5. The removal assembly of claim 3, wherein the flange extends from the powered tailgate and the slot is within the cup.

6. The removal assembly of claim 1, further comprising a drive unit that moves the powered tailgate back-and-forth between the open and closed positions.

7. The removal assembly of claim 6, wherein a drive rod of the drive unit extends from the powered tailgate.

8. The removal assembly of claim 1, further comprising a drive rod of a drive unit coupled to a drive rod support when the powered tailgate is coupled to the vehicle, the drive unit configured to move the powered tailgate back-and-forth between the open and closed positions.

9. The removal assembly of claim 8, wherein the lock comprises a cup that rotates together with the powered tailgate about an axis relative to the drive rod support, the cup in the locked position blocking a withdrawal of the drive rod from the drive rod support, the cup in the unlocked position permitting the withdrawal.

10. The removal assembly of claim 9, wherein the cup in the locked position blocks the decoupling by blocking radial movement of the drive rod relative to the drive rod support, wherein the cup in the unlocked position has a slot that is circumferentially positioned such that the slot provides clearance to move the drive rod radially relative to the drive rod support.

11. The removal assembly of claim 8, wherein the drive rod support slideably receives the drive rod when the powered tailgate is coupled to the vehicle.

12. The removal assembly of claim 1, wherein the lock is in the unlocked position when the powered tailgate is halfway between a fully open position and a fully closed position.

13. A removal method, comprising:
moving a powered tailgate that is coupled to a vehicle in a coupled position, the moving transitioning a lock from a locked position to an unlocked position, the lock in the locked position blocking movement of the powered tailgate from the coupled position, the lock in the unlocked position permitting removal of the powered tailgate, wherein at least a portion of the lock rotates together with the powered tailgate when the powered tailgate is coupled to the vehicle in the coupled position and moved back-and-forth between an open and closed position.

14. A removal method, comprising:

moving a powered tailgate that is coupled to a vehicle in a coupled position, the moving transitioning a lock from a locked position to an unlocked position, the lock in the locked position blocking movement of the powered tailgate from the coupled position, the lock in the unlocked position permitting removal of the powered tailgate, wherein the lock is a cup having a slot, and the lock is transitioned to the locked position when the cup is rotated such that the slot is in a position where the slot permits movement of the powered tailgate from the coupled position.

15. The removal method of claim 14, further comprising rotating the cup together with the powered tailgate using a flange that is at least partially received within the slot.

16. The removal method of claim 15, wherein the cup is pivotably connected to a vehicle body structure and the flange extends from the tailgate.

17. The removal method of claim 14, wherein the cup at least partially receives a drive rod of a drive unit that is configured to move the powered tailgate back and forth between the open and closed position.

18. The removal method of claim 13, wherein the moving is between the open position and the closed position.

* * * * *